United States Patent [19]

Ellis

[11] Patent Number: 5,153,428
[45] Date of Patent: Oct. 6, 1992

[54] CONFOCAL LASER SCANNING MICROSCOPE HAVING RELAY LENS AND A SLIT FOR REMOVING STRAY LIGHT

[75] Inventor: Gordon W. Ellis, Media, Pa.
[73] Assignee: Hamamatsu Photonics K.K., Hamamatsu, Japan
[21] Appl. No.: 839,705
[22] Filed: Feb. 24, 1992

Related U.S. Application Data

[63] Continuation of Ser. No. 538,405, Jun. 15, 1990, abandoned.

[51] Int. Cl.$^5$ ................................. H01J 3/14
[52] U.S. Cl. .................... 250/234; 359/197
[58] Field of Search ............... 250/234, 236; 356/376; 350/6.1, 6.5, 6.91, 6.6; 359/197, 212, 213, 214

[56] References Cited

U.S. PATENT DOCUMENTS 4,745,270  5/1988  Horikawa et al. ................ 250/234
4,893,008  1/1990  Horikawa ........................ 250/234

OTHER PUBLICATIONS

Stelzer, "Considerations on the Intermediate Optical System in Confocal Microscopes", Confocal Microscopy Handbook, pp. 83–92.
Inoue, "Foundations of Confocal Scanned Imaging in Light Microscopy", Confocal Microscopy Handbook, pp. 1–13.

Primary Examiner—David C. Nelms
Assistant Examiner—T. Davenport
Attorney, Agent, or Firm—Cushman, Darby & Cushman

[57] ABSTRACT

This invention comprises a pair of light deflecting members disposed in an optical path formed between a light source and an objective lens, and a pair of relay lenses disposed in an optical path formed between the pair of light deflecting members; and a slit member disposed in an optical path formed between the pair of relay lens.

8 Claims, 1 Drawing Sheet

CONFOCAL LASER SCANNING MICROSCOPE HAVING RELAY LENS AND A SLIT FOR REMOVING STRAY LIGHT

This is a continuation division of application Ser. No. 07/538,405, filed on Jun. 15, 1990, which was abandoned upon the filing hereof.

BACKGROUND OF THE INVENTION

1. Field of the Invention

This invention relates to a confocal laser scanning microscope.

2. Related Background Art

A scanning optical microscope for deflecting a light beam to scan a specimen, which has acquired high resolving power but still retains convenience is known (Japanese Patent Laid-Open Publication No. 219919/1986).

This scanning optical microscope has the drawback that stray reflected and scattered light produced when the laser beam passes through the relatively large number of optical elements lowers the measuring precision of the microscope.

SUMMARY OF THE INVENTION

An object of this invention is to provide a confocal laser scanning microscope which can remove most of the unwanted reflected and scattered light produced when the laser beam passes through optical elements.

For the purpose of achieving this object, this invention comprises a light source; an objective lens for converging light emitted from the light source onto an object; a pair of light deflecting members disposed in an optical path formed between the light source and the objective lens for changing the angle of incidence of light incident on the objective lens so as to cause the light to scan the object; a detector for detecting light from the object; and a pair of relay lenses disposed in an optical path formed between the light deflecting members of the pair, and, additionally, a slit being disposed in an optical path formed between the relay lenses of the pair.

In this invention having this structure, the slit functions to remove most of the stray reflected and scattered light produced when the laser beam passes through the other optical elements.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The FIGURE is a schematic view of the confocal laser scanning microscope according to one embodiment of this invention.

DESCRIPTION OF THE PREFERRED EMBODIMENT

Figure 1:
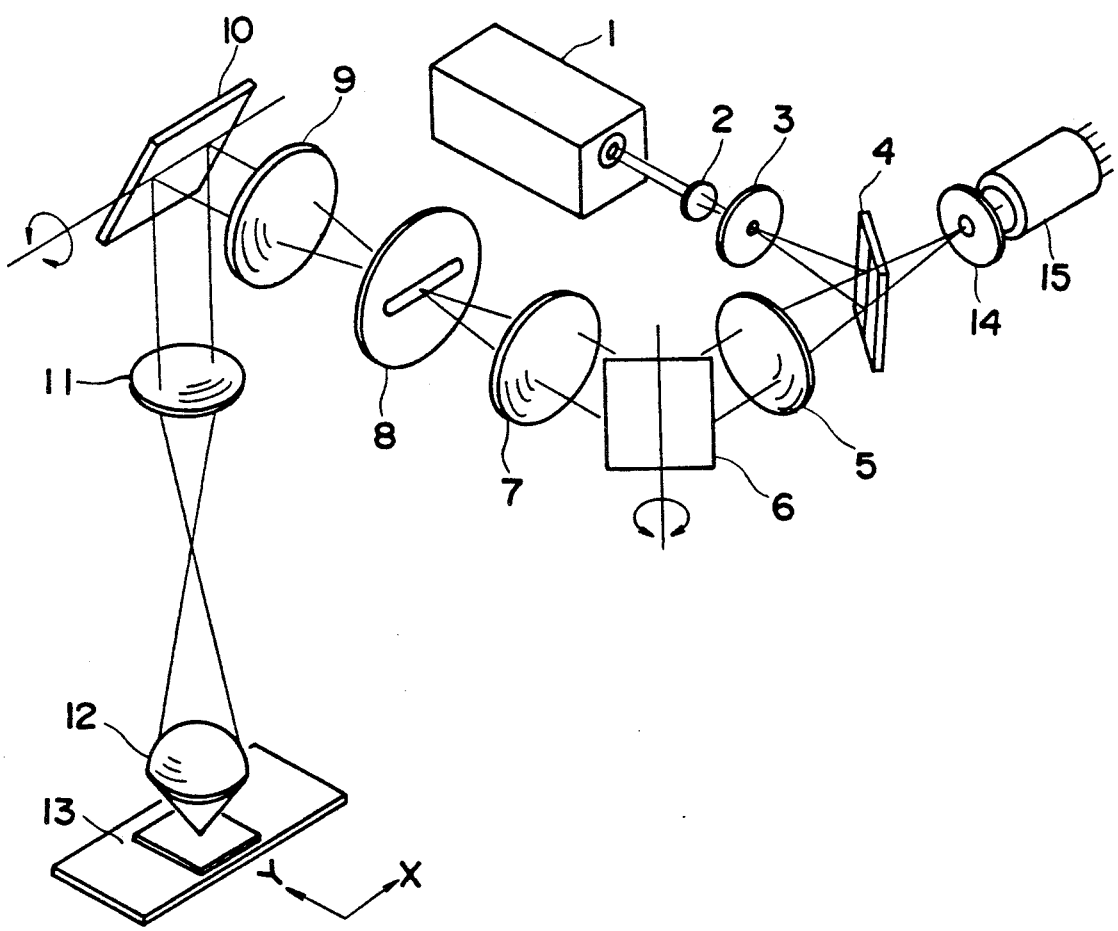

The confocal laser scanning microscope according to one embodiment of this invention will be explained below with reference to the drawing attached hereto.

One element has the same reference numeral throughout the description so as not to repeat its explanation.

The FIGURE is a schematic view of the confocal laser scanning microscope according to one embodiment of this invention. A condenser lens 2, a pinhole member 3 and a half mirror 4 are arranged in the direction of emittance of a laser beam from a laser beam source 1. The half mirror 4 is so inclined that a laser beam from the laser beam source 1 can be reflected by 90 degrees. In the direction of travel of the reflected light a collimator lens 5, an X-direction light deflecting member 6 are arranged. On the light outgoing side of the X-direction light deflecting member 6, a relay lens 7, a slit member 8, a relay lens 9 and a Y-direction light deflecting member 10 are arranged substantially linearly. The slit member 8 is located at a conjugate position with the pinhole 3 and has a slit formed in the X direction. A lens 11, an objective lens 12 and a specimen 13 are arranged on the light outgoing side of the Y-direction light deflecting member 10. On the opposite side of the collimator lens 5 across the half mirror 4 there are arranged a detector 15 through a pinhole member 14.

Next, the operation of the confocal laser scanning microscope according to the above-described embodiment will be explained below. A laser beam emitted from the laser source 1 is condensed onto the pinhole member 3 by the condenser lens 2 to form a point light source. This point light source is reflected by the half mirror 4 and is incident on the collimator lens 5 to be formed into parallel light. The angle of incidence of this parallel light, later to be incident on the objective lens 12, is changed in the X direction by the X-direction light deflecting member 6 to make a scanning beam. This beam is incident on the relay lens 7, the slit member 8 and relay lens 9. The angle of incidence of the light from the relay lens 9, to be incident on the objective lens 12, is changed in the Y-direction by the Y-direction light deflecting member 10. Y-direction is perpendicular to the X-direction. This beam scanned by the Y-direction light deflecting member 10 is incident on the lens 11, and the image of 10, 6 is formed on the pupil of the objective lens 12. The laser beam passed through the objective lens 12 scans the speciment 13 in two dimensions. The reflected beam from the specimen 13 returns reversely up to the half mirror 4 along quite the same path as it has traveled along to the specimen 13 and is taken out by the half mirror 4 as a detected beam. The detected beam is condensed on the pinhole member 14 to be formed into a point light source. The light from the point light source is supplied to the detector 15.

According to this embodiment, the slit member 8 is disposed between the relay lenses 7, 9, whereby the stray reflected and scattered light generated in the optical system between the slit member 8 and the specimen 13, including all the elements of the objective lens 12 can be removed. This pre-removal of stray light improves the performance of the confocal pinhole member 14 in its function of removing unnecessary light. Consequently an image of good contrast can be formed.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A confocal laser scanning microscope, comprising:
    a light source;
    an objective lens for converging a light emitted from the light source;
    first and second light deflecting members disposed in an optical path formed between the light source and the objective lens for changing an angle of incidence of the light incident on the objective lens so as to cause the light to scan an object;
    a detector for detecting light reflected from the object;
    first and second relay lenses disposed in an optical path formed between the pair of light deflecting members; and
    a slit member disposed in an optical path formed between the pair of relay lenses;
    wherein the light follows an optical path that travels between the deflecting members in the order comprising:
        the first deflecting member;
        the first relay lens;
        the slit member;
        the second relay lens; and
        the second deflecting member; and
    wherein the light reflected from the object returns to said detector along the optical path in a direction opposite that travelled by light emanated from said light source and incident upon said object;
    whereby said slit member rejects stray light caused by scattering or reflections from optical surfaces.

2. A confocal laser scanning microscope according to claim 1 further comprising a pinhole member disposed in an optical path formed between the light source and the light deflecting members.

3. A confocal laser scanning microscope according to claim 2, wherein the slit member is located at a conjugate position with the pinhole member.

4. A confocal laser scanning microscope according to claim 1 further comprising a pinhole member disposed in an optical path formed between the light deflecting members and the detector.

5. A confocal laser scanning microscope according to claim 1 further comprising a first pinhole member disposed in an optical path formed between the light source and the light deflecting members; and
    a second pinhole member disposed in an optical path formed between the light deflecting members and the detector;
    whereby said slit member enhances image contrast by excluding reflection from optical surfaces in the light path between an entrance and exit pinhole of the pinhole members.

6. A confocal laser scanning microscope according to claim 1, wherein the pair of light deflecting members are a first light deflecting member for changing an angle of incidence of the light on the objective lens in a required direction, and a second light deflecting member for changing an angle of incidence of the light on the objective lens in a direction perpendicular to the set direction.

7. A confocal laser scanning microscope according to claim 1, wherein the slit member has a slit formed in the direction of change of an angle of incidence of the light on the objective lens caused by the light deflecting member disposed on the side of the light source.

8. A confocal laser scanning microscope, comprising, in order from an object,
    an objective lens unit for focusing light on the object and for receiving light reflected from the object;
    a first lens unit for directing light onto the objective lens unit and receiving light reflected by the object from the objective lens unit;
    a first deflecting member for changing the direction of light in a first direction onto the first lens unit and for deflecting light from said first deflecting member in a first direction;
    a first relay lens unit for directing light onto the first deflecting member and receiving light from the first deflecting member;
    a slit member for removing stray light from the microscope, the slit member disposed to receive light from the first relay lens and to direct light onto the first relay lens;
    a second relay lens unit for directing light through said slit member towards said first relay lens unit and receiving light reflected from the object that has passed through said slit member;
    a second deflecting member for changing the direction of light in a second direction towards said second relay lens and for receiving light from said second relay member;
    a collimator lens for directing light onto the second deflecting member and for receiving light reflected from the second deflecting member;
    a half mirror for directing light towards the collimator lens and for passing light reflected from the object that has passed through the collimator lens;
    a first pinhole member for passing the light reflected from the object that has passed through the half mirror;
    a detector for detecting the light passing through the first pinhole member;
    a second pinhole member for directing light to said half mirror;
    a condenser lens for directing light onto the second pinhole member; and
    a light source for emitting light onto the condenser lens and for scanning across the object.

* * * * *